(12) United States Patent
Mayerle (10) Patent No.: US 12,225,845 B2
(45) Date of Patent: *Feb. 18, 2025

(54) WEED SEED DESTRUCTION WITH ROTOR AND STATOR WHERE THE DISCHARGE IS AXIALLY SPACED FROM THE INLET

(71) Applicant: Dean Mayerle, Saskatoon (CA)

(72) Inventor: Dean Mayerle, Saskatoon (CA)

(73) Assignee: Tritana Intellectual Property Ltd., Saskatoon (CA)

( * ) Notice: Subject to any disclaimer, the term of this patent is extended or adjusted under 35 U.S.C. 154(b) by 1058 days.

This patent is subject to a terminal disclaimer.

(21) Appl. No.: 17/150,181

(22) Filed: Jan. 15, 2021

(65) Prior Publication Data

US 2021/0127586 A1 May 6, 2021

Related U.S. Application Data

(60) Continuation of application No. 16/654,162, filed on Oct. 16, 2019, now Pat. No. 11,612,101, which is a
(Continued)

(51) Int. Cl.
*A01D 41/12* (2006.01)
*A01D 69/00* (2006.01)
(Continued)

(52) U.S. Cl.
CPC ......... *A01D 41/1243* (2013.01); *A01D 69/00* (2013.01); *A01F 12/40* (2013.01); *A01F 12/48* (2013.01)

(58) Field of Classification Search
CPC .......... A01F 12/40; A01F 12/48; A01F 12/54; A01F 7/06; A01D 41/1243
(Continued)

(56) References Cited

U.S. PATENT DOCUMENTS

| 2,064,689 A | * | 12/1936 | Russwurm | ............. A01F 12/40 |
| | | | | 241/190 |
| 2,557,865 A | | 6/1951 | Emmanouilidis | |

(Continued)

FOREIGN PATENT DOCUMENTS

| AU | A-37966/95 | 5/1996 |
| AU | A-71759/96 | 5/1997 |

(Continued)

*Primary Examiner* — Adam J Behrens
(74) *Attorney, Agent, or Firm* — Adrian D. Battison; Ade & Company Inc.; Ryan W. Dupuis (57) ABSTRACT

Weed seeds are destroyed in the chaff from a combine harvester by repeated high speed impacts caused by a rotor mounted in one of a pair of side by side housings which accelerate the discarded seeds in a direction centrifugally away from the rotor onto a stator including angularly adjustable stator surfaces around the axis. Thus the discarded seeds rebound back and forth between the rotor and the stator to provide a plurality of impacts. The seeds are carried axially of the rotor by a controlled airstream so that they move to an axial discharge location where a discharge fan is mounted. The angle of the discharge around the rotor axis can be changed to direct the seeds to the side of the combine away from a straw chopper, towards the guide fins of the tailboard of the chopper, or into the housing of the straw chopper.

18 Claims, 10 Drawing Sheets

Related U.S. Application Data division of application No. 16/016,827, filed on Jun. 25, 2018, now Pat. No. 10,485,178, which is a continuation of application No. 15/701,096, filed on Sep. 11, 2017, now Pat. No. 10,492,369, which is a continuation-in-part of application No. 15/209,151, filed on Jul. 13, 2016, now Pat. No. 10,004,176.

(60) Provisional application No. 62/192,111, filed on Jul. 14, 2015.

(51) Int. Cl.
*A01F 12/40* (2006.01)
*A01F 12/48* (2006.01)

(58) Field of Classification Search
USPC .................................................. 460/111, 112
See application file for complete search history.

(56) References Cited

U.S. PATENT DOCUMENTS

| | | | | |
|---|---|---|---|---|
| 2,775,174 | A * | 12/1956 | Everett | A01B 77/00 209/225 |
| 3,071,246 | A * | 1/1963 | Schimke | A01D 41/1243 209/27 |
| 3,448,933 | A | 6/1969 | Roy | |
| 3,894,695 | A | 7/1975 | Benedikter | |
| 4,591,102 | A * | 5/1986 | Clarke | A01D 41/1243 239/689 |
| 4,637,406 | A | 1/1987 | Guinn | |
| 4,711,253 | A * | 12/1987 | Anderson | A01D 41/1243 56/13.3 |
| 4,917,652 | A * | 4/1990 | Glaubitz | A01D 41/1243 460/111 |
| 4,923,431 | A * | 5/1990 | Miller | A01D 41/1243 239/689 |
| 5,425,507 | A | 6/1995 | Stumpff | |
| 5,556,042 | A | 9/1996 | Roberg | |
| 5,944,604 | A | 8/1999 | Niermann | |
| 6,500,064 | B1 * | 12/2002 | Schrattenecker | A01D 41/1243 460/100 |
| 6,547,169 | B1 * | 4/2003 | Matousek | A01D 41/1243 239/653 |
| 6,656,038 | B1 * | 12/2003 | Persson | A01F 12/40 460/112 |
| 6,685,558 | B2 * | 2/2004 | Niermann | A01D 41/1243 460/111 |
| 6,840,854 | B2 * | 1/2005 | Redekop | A01F 12/40 460/112 |
| 6,908,379 | B2 * | 6/2005 | Gryspeerdt | A01F 12/40 460/111 |
| 8,152,610 | B2 * | 4/2012 | Harrington | B02C 13/288 460/111 |
| 8,167,691 | B2 * | 5/2012 | Pohlmann | A01D 41/1243 460/112 |
| 8,210,915 | B2 * | 7/2012 | Holmen | A01D 41/1243 460/111 |
| 8,789,785 | B2 | 7/2014 | Lelas | |
| 9,497,903 | B2 * | 11/2016 | Biggerstaff | A01F 12/40 |
| 9,635,813 | B2 * | 5/2017 | Dilts | A01F 29/04 |
| 9,686,916 | B2 | 6/2017 | Biggerstaff | |
| 9,723,790 | B2 * | 8/2017 | Berry | A01D 41/1243 |
| 9,730,390 | B2 * | 8/2017 | Maes | A01D 41/1243 |
| 9,949,434 | B2 * | 4/2018 | Baes | A01F 12/48 |
| 10,004,176 | B2 * | 6/2018 | Mayerle | A01F 12/48 |
| 10,653,069 | B2 | 5/2020 | Farley | |
| 2003/0003974 | A1 * | 1/2003 | Niermann | A01D 41/1243 460/111 |
| 2003/0114207 | A1 * | 6/2003 | Wolters | A01F 12/40 460/111 |
| 2004/0132517 | A1 * | 7/2004 | Weichholdt | A01F 12/40 460/112 |
| 2005/0277454 | A1 * | 12/2005 | Couture | A01D 41/1243 460/111 |
| 2010/0291985 | A1 | 11/2010 | Pohimann | |
| 2011/0059782 | A1 * | 3/2011 | Harrington | B02C 13/288 241/278.1 |
| 2014/0364179 | A1 * | 12/2014 | Brinkmann | A01D 41/1243 460/112 |
| 2015/0373913 | A1 * | 12/2015 | Berry | A01F 12/00 460/149 |
| 2016/0044869 | A1 * | 2/2016 | Mayerle | A01F 29/12 460/1 |
| 2016/0044870 | A1 | 2/2016 | Mayerle | |
| 2016/0113202 | A1 | 4/2016 | Mayerle | |
| 2016/0150727 | A1 * | 6/2016 | Mayerle | A01D 41/1243 460/112 |
| 2016/0150728 | A1 * | 6/2016 | Duquesne | A01F 12/442 460/149 |
| 2017/0079207 | A1 * | 3/2017 | Puryk | A01F 12/40 |
| 2017/0238463 | A1 * | 8/2017 | Van de Wege | A01F 12/40 |
| 2018/0070534 | A1 | 3/2018 | Mayerle | |
| 2018/0249641 | A1 | 9/2018 | Lewis | |
| 2018/0317392 | A1 | 11/2018 | Mayerle | |
| 2018/0368319 | A1 | 12/2018 | Desmet | |
| 2019/0283034 | A1 * | 9/2019 | Berry | B02C 13/16 |
| 2020/0296896 | A1 | 9/2020 | Mayerle | |
| 2021/0022289 | A1 | 1/2021 | Berry | |
| 2021/0282329 | A1 | 9/2021 | Hall | |

FOREIGN PATENT DOCUMENTS

| | | | |
|---|---|---|---|
| AU | 200138781 | 10/2001 | |
| AU | 2014218502 | 9/2015 | |
| AU | 2017228663 | 10/2017 | |
| AU | 2018100350 | 5/2018 | |
| AU | 2019202177 | 10/2019 | |
| CN | 202444821 U * | 9/2012 | ............. A01F 12/18 |
| DE | 382632 | 10/1923 | |
| DE | 102006040255 | 4/2007 | |
| DE | 102006040255 A1 * | 4/2007 | ............. A01F 12/40 |
| DE | 102009042002 | 3/2011 | |
| DE | 102011088512 | 1/2013 | |
| DE | 102011088512 B3 * | 1/2013 | ............. A01F 12/40 |
| DE | 102018131432 | 6/2020 | |
| DE | 102018131432 A1 * | 6/2020 | ......... A01D 41/1243 |
| EP | 958727 A1 * | 11/1999 | ......... A01D 41/1243 |
| EP | 1027820 | 8/2000 | |
| EP | 1027820 A1 * | 8/2000 | ......... A01D 41/1243 |
| EP | 1191835 | 4/2002 | |
| EP | 1442649 | 8/2004 | |
| EP | 1905291 | 4/2008 | |
| EP | 2976937 | 1/2016 | |
| EP | 3520596 | 8/2019 | |
| EP | 3520596 A1 * | 8/2019 | ......... A01D 41/1243 |
| GB | 1062209 | 3/1967 | |
| WO | WO 01/01754 | 1/2001 | |
| WO | WO-2008156419 | 12/2008 | |
| WO | WO-2008156419 A1 * | 12/2008 | ......... A01D 41/1243 |
| WO | WO-2009100500 | 8/2009 | |
| WO | WO-2009100500 A1 * | 8/2009 | ............. A01F 12/40 |
| WO | WO-2014127408 | 8/2014 | |
| WO | WO-2014127408 A1 * | 8/2014 | ............. A01D 41/12 |
| WO | WO2017/008161 | 1/2017 | |
| WO | WO2018053600 | 3/2018 | |
| WO | WO2019178651 | 9/2019 | |
| WO | WO-2020160622 | 8/2020 | |

* cited by examiner

WEED SEED DESTRUCTION WITH ROTOR AND STATOR WHERE THE DISCHARGE IS AXIALLY SPACED FROM THE INLET

This application is a continuation of application Ser. No. 16/654,162 filed Oct. 16, 2019 which is a divisional application of application Ser. No. 16/016,827 filed Jun. 25, 2018 which issued as U.S. Pat. No. 10,485,178 on Nov. 26, 2019, which is a continuation of application Ser. No. 15/701,096 filed Sep. 11, 2017 which issued as U.S. Pat. No. 10,492,369 on Dec. 3, 2019, which is a continuation in part of application Ser. No. 15/209,151 filed Jul. 13, 2016 which is issued as U.S. Pat. No. 10,004,176 on Jun. 26, 2018.

This application claims the benefit under 35 USC 119 (e) of Provisional application 62/192,111 filed Jul. 14, 2015.

This invention relates to a weed seed destructor which can be attached to a combine harvester so that weed seeds in the discharged chaff can be devitalized before being spread onto the ground.

BACKGROUND OF THE INVENTION

Combine harvesters harvest cereal grain crops, such as wheat, oats, rye, barley, corn, soybeans and flax. Grain and straw are separated in a combine harvester. Following the separation process, waste straw and chaff is supplied to a chopper for shredding and distributing back over the field in an even spread pattern.

During the harvesting process weed seeds and grain seed are discharged with the residue into the chopper and spread back onto the field. The combine is then effectively acting as a seeder to evenly spread the seed back onto the field. In a number of areas of the world herbicides are used heavily to control the weed seeds however this has led to weed and grain seed that has become resistant to the herbicide.

It is known that if the seed can be removed or destroyed before the combine spreads it back onto the field the cycle can be stopped. Research has shown that, with three consecutive cycles of weed and grain removal, significant reductions in herbicide can be obtained providing huge saving for farmers.

One recent approach is shown in WO 2014/127408 published Aug. 28, 2014 and assigned to Grains Research Development Corporation Australia which shows that a plurality of impacts at relatively high speed of the seeds with a stationary object causes breakdown of the seed sufficient to prevent germination. Thus they have developed a cage mill which is integrally mounted inside the combine harvester so as to receive waste material (discarded seeds and chaff) from the sieve. The cage mill assembly includes at least one rotating ring carrying a plurality of blades and a series of outer stationary rings or fixed blades. Thus the seeds are accelerated outwardly by escaping centrifugally from the rotating blades into the surrounding stationary blades of the outer rings where a series of impacts occur as the seeds move outwardly into and through the fixed blades. The seeds are released outwardly under the centrifugal force from the stationary blades and escape outwardly into a peripheral channel for discharge.

The document shows evidence that four impacts at relatively high speed are sufficient to cause the required breakdown of the seeds, for example to obtain a 95% kill rate.

However the cage mill shown is large and complex with numerous rings running in opposite directions. Should a rock, or other hard material enter the mill, the entire cage mill would need to be replaced. Thus the system may function to destroy the seeds but has practical difficulties as it is without consideration of other obstacles passing through the assembly. The assembly runs at a very high rotational speed, so the precision in manufacturing is critical. Although this is believed that this arrangement is closer to commercialization a number of problems remain with the design.

U.S. Pat. No. 3,448,933 (Roy) issued Jun. 10, 1969 describes a cone style grinding shear mill used to process weed seed. All excess chaff and weed seed is processed by the unit. However it is a permanently fixed grinder without a means to bypass material other than residue. It would also allow passage of small fine seeds as it would need to be set to the average seed size to allow adequate throughput.

U.S. Pat. No. 5,059,154 (Reyenga) issued Oct. 22, 1991 discloses a pair of rollers to mill seeds smaller than grain that are in the clean grain auger. This does not address seeds thrown over the back of the sieve and would not work if placed behind the sieve as today's combines the chaff stream is often 6 inches thick which would cushion the seeds and allow the spread of live seed back onto the field.

In AU Published Application 2001/038781 an additional sieve is added to remove more of the chaff before milling, and separate the weed seed from the grain. However this is not practical with today's combines. All combines throw out some grain and farmers want the herbicide tolerant grain removed as well.

U.S. Pat. No. 8,152,610 (Harrington) issued Apr. 10, 2012 discloses an arrangement which processes all the chaff coming off of the sieves and blows it to a trailing cart to pulverize all of the residue. The cart requires a second engine running in the dust of the combine and the mill requires a significant amount of power to pulverize and discharge the residue back onto the field. The cage mill disclosed is large and complex with numerous rings running in opposite directions. Again, the rings have not removable parts so should a rock, or other hard material enter it the entire cage mill would need to be replaced. The cost of this system will limit its commercial viability.

The term weed seed destruction used herein is used somewhat colloquially in that the seeds are not annihilated but are devitalized or rendered so that they cannot germinate. It will of course also be appreciated that not necessarily each and every seed is destroyed but that the intention is that a significant number will be incapable of germination so as to reduce the number of emerging seeds in the growing season.

SUMMARY OF THE INVENTION

According to the invention there is provided an apparatus for use in a combine harvester which includes a separation system for separating from harvested crop a first material comprising straw and a second material comprising chaff and weed seeds, the apparatus comprising:

a weed seed destructor section arranged to be mounted on the combine harvester at a location to receive the second material comprising:

a housing having at least one inlet for receiving the second crop residue material from the second discharge location and at least one outlet for discharging the second crop residue material after passage through the housing;

two or more rotors located in the housing each for rotation about a respective axis where the axes are parallel, each rotor comprising a plurality of radially extending impact members;

said at least one outlet of the housing being axially spaced from said at least one inlet of the housing;

and one or more fan members arranged to urge the crop residue material to move through the housing from said at least one inlet to said at least one outlet;

wherein the plurality of radially extending impact members are configured to rotate with said two or more rotors and impact against the crop residue material as the crop residue material passes through the housing.

Preferably in one embodiment the fan members, the impact members and the housing are configured so that less dense material of the second crop residue material defined by the chaff is subjected to less impacts and denser material of the second crop residue material defined by the weed seeds is subjected to relatively more impacts.

Preferably in one embodiment the fan member is in the form of a paddle of a spreader located at an outlet end of the housing.

Preferably in one embodiment the housing is shaped so that it approximates the outer dimensions of the rotors.

Preferably in one embodiment the housing is shaped so that it substantially follows an orbit of a tip of each of the impact members and wherein the impact members are arranged in two parallel rows.

Preferably in one embodiment the impact members rotate with velocity so as to damage weed seeds in the crop residue upon impact.

Preferably in one embodiment the apparatus is configured so that the denser material comprising weed seeds which are retained in the housing until the weed seeds are sufficiently impacted so as to damage a substantial amount of weed seed in the second crop residue material before it exits the outlet and the less dense material is the remainder of the crop residue which has received fewer impacts than the seeds within the housing when it exits the outlet.

Preferably in one embodiment the housing comprises an inwardly directed annulus at the outlet between the housing and said one or more fan members.

Preferably in one embodiment the less dense material of the second crop residue material is more influenced by the air flow and the denser material of the second crop residue material is more influenced by a centrifugal force imparted by said two or more rotors.

Preferably in one embodiment the housing includes means for returning the material impacted thereon back toward the said two or more rotors.

Preferably in one embodiment the rotors and the housing arranged such that the weed seeds rebound back and forth between said two or more rotors and the housing to provide a plurality of impacts on the weed seeds to destroy at least some of the weed seeds.

Preferably in one embodiment the discharge opening is at a location different from the housing so that said weed seeds discharged from the rotor through said discharge opening do not exit through the housing.

Preferably in one embodiment the rotors rotate around an axis so as to direct the weed seeds centrifugally outwardly, and the housing surrounds the axis so as to rebound the weed seeds back toward the axis and the discharge opening is arranged such that the discarded seeds discharge axially from within the housing.

Preferably in one embodiment the housing is arranged to be mounted directly under the second discharge location of the combine harvester with the rotor axis generally upright so that the second crop residue material falls directly into the top of the housing on to said two or more rotors along the axial direction of the rotors.

Preferably in one embodiment the second crop residue material enters the housing axially of said two or more rotors at one end and discharges axially from the opposite end of the housing.

Preferably in one embodiment the fan members is arranged to direct the second crop residue material radially outwardly relative to the axis of the rotor.

Preferably in one embodiment the housing comprises a stator including one or more stator surfaces for engaging the weed seeds when accelerated by said two or more rotors.

Preferably in one embodiment the stator surfaces are arranged at an angle to a tangent of an imaginary cylindrical surface surrounding the axis.

Preferably in one embodiment the angle of the stator surfaces to the tangent is adjustable.

Preferably in one embodiment the stator surfaces and/or the rotor surfaces are arranged to pivot so as to increase the spacing therebetween to allow the passage of foreign objects between the rotor and stator.

Preferably in one embodiment the stator surfaces are readily removable for replacement when damaged or worn.

Preferably in one embodiment the velocity of air generated by said one or more fan members is adjustable to change the number of impacts a seed encounters during its passage.

Preferably in one embodiment the impact members of said two or more rotors include a generally flat surface having a first end edge spaced axially of a second edge so that the surface when rotated provides a width between the first and second end edges for engaging the weed seeds.

The embodiments disclosed hereinafter provide a number of further features and aspects. One of these is directed to an apparatus for destroying weed seeds comprising:

a housing arranged to be mounted at a location on a combine harvester for receiving from the location a feed material containing separated chaff and weed seeds separated by the combine harvester from harvested crop;

a rotor mounted in the housing for rotation about an axis and including rotor surfaces thereon for engaging the feed material and for accelerating the feed material in a direction outwardly from the axis of the rotor;

a stator arranged at a location along the direction and including one or more stator surfaces for engaging the weed seeds in the accelerated feed material;

said stator and said one or more stator surfaces of the stator being arranged such that the weed seeds impact on said one or more stator surfaces and do not pass through the stator along said direction but instead are rebounded therefrom back toward the rotor;

the rotor and stator being arranged such that the weed seeds rebound back and forth between the rotor and the stator to provide a plurality of impacts on the accelerated feed material to destroy at least some of the weed seeds;

wherein the housing includes a discharge opening for discharge of the feed material after the plurality of impacts, where the discharge opening is at a location different from the stator so that said weed seeds discharged from the rotor through said discharge opening do not pass through the stator.

Preferably therefore the discharge opening for discharge of the feed material after the plurality of impacts the discarded seeds discharge from the rotor and do not pass through the stator but instead are rebounded away from the stator to discharge at a different location. In this way, any foreign bodies are not trapped in the stator to cause damage but instead can escape to the discharge.

In the preferred arrangement described in detail hereinafter, the rotor rotates around an axis so as to direct the discarded seeds centrifugally outwardly, and the stator surrounds the axis so as to rebound the discarded seeds back toward the axis and the discharge opening is arranged such that the discarded seeds discharge axially from within the stator.

In one arrangement the rotor is mounted directly under the first discharge location of the combine harvester with the rotor axis generally upright so that the feed material fold directly into the top of the housing on to the rotor along the axial direction of the rotor.

As an alternate embodiment the apparatus comprises a horizontal rotor defined by a horizontally rotating tube or shaft, with auger fighting in the middle of the shaft, moving the feed material or chaff to an impact zone at each end of the horizontal rotor. The discharge zone is then at the end and is arranged to expel into the straw chopper of the combine harvester.

Preferably as a feature of independent importance the feed material enters the housing axially of the rotor at one end and discharges axially from the opposite end of the rotor.

Preferably as a feature of independent importance there is provided a fan component for driving the discarded seeds from the opposite end radially outwardly.

Preferably as a feature of independent importance the stator includes a plurality of stator surfaces spaced angularly around the axis.

Preferably as a feature of independent importance the stator surfaces are arranged at an angle to a tangent of an imaginary cylindrical surface surrounding the axis.

Preferably as a feature of independent importance the angle of the stator surfaces to the tangent is adjustable.

Preferably as a feature of independent importance the stator surfaces and/or the rotor surfaces are arranged to pivot so as to increase the spacing therebetween to allow the passage of foreign objects between the rotor and stator.

Preferably as a feature of independent importance the stator surfaces are readily removable for replacement when damaged or worn.

Preferably as a feature of independent importance the stator surfaces include one or more fins extending generally around the axis.

Preferably as a feature of independent importance the housing when viewed in plan longitudinal of the axis of the rotor is of polygonal shape to define a plurality of apexes at angularly spaced positions around the axis and the stator surface in plan view includes a plurality of pairs of stator surfaces which form a V shape converging to a respective one of the apexes.

Preferably as a feature of independent importance the rotational speed of the rotor is adjustable to change the number of impacts a seed encounters during its passage.

Preferably as a feature of independent importance the velocity of air along the rotor is adjustable to change the number of impacts a seed encounters during its passage.

Preferably as a feature of independent importance the rotor and the stator are arranged so that the impacts act to move the discarded seeds along the rotor so as to change the position along the rotor at which the impacts of the discarded seeds occurs.

Preferably as a feature of independent importance there is provided two housings each including a rotor and stator arranged side by side across the width of the discharge location.

Preferably as a feature of independent importance each of the housings is rotatable about the axis of the respective rotor to change an angle of the discharge around the axis.

According to one feature described herein, there is provided an apparatus for destroying weed seeds for use in a combine harvester where the combine harvester comprises a separation system for separating from harvested crop at a first discharge location feed material including chaff and said weed seeds and at a second discharge location straw, the apparatus comprising:

a straw chopper section comprising:
a chopper housing for mounting at the second location on the combine harvester for receiving from the first discharge location a feed material containing separated straw separated by the combine harvester from harvested crop;
a chopper rotor mounted in the housing for chopping the straw for discharge from the housing;
and a spreading device onto which the discharged straw is directed;
and a weed seed destruction section comprising:
a housing arranged to be mounted at the first location for receiving from the first discharge location the feed material containing separated chaff and said weed seeds;
a rotor mounted in the housing for rotation about an axis and including rotor surfaces thereon for engaging the feed material and for accelerating the feed material in a direction outwardly from the axis of the rotor;
a stator arranged at a location along the direction and including one or more stator surfaces for engaging the weed seeds in the accelerated feed material to cause impacts with the weed seeds;
wherein the housing includes a discharge opening for discharge of the feed material after the plurality of impacts;
wherein the straw chopper section and the weed seed destruction section comprise a common unit.

Preferably the common unit includes is a common drive from the combine harvester to the common unit.

That is preferably the weed seed destruction section is driven from the straw chopper section.

In the common unit preferably the weed seed destruction section is arranged such that material from the discharge opening can be fed into the straw chopper section.

In this arrangement there are preferably provided two housings each including a rotor and stator arranged side by side across the width of the second discharge location.

In this arrangement preferably each of the housings is rotatable about the axis of the respective rotor to change an angle of the discharge around the axis such that the discharge opening can be directed to the side of the combine away from the straw chopper, towards the guide fins of the tailboard of the chopper, or into the housing of the straw chopper.

In addition to the above defined features, the seed destruction section can include any of the features previously defined.

The arrangement as described hereinafter may provide one or more of the following features and advantages:

To provide a seed destroyer in which the residue does not pass through rotating or stationary rings of objects so that there is less potential for damage on passage of a solid object.

To provide a seed destroyer in which the impacting members of the destructor can be hard surface coated and easily removable for annual replacement and preparation for the next harvest.

To provide a seed destroyer in which the number of hits a seed impacts can be adjusted or tuned for optimum destruction.

To provide a seed destroyer which can allow passage of debris such as rocks and other hard objects without damage or destruction, and has replaceable parts should the object cause damage.

To provide an integrally mounted seed destroyer in which the trajectory of the discharge can be changed from the side of the combine, to the back of the combine tailboard, or into the chopper so that the residue can be spread with the straw.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
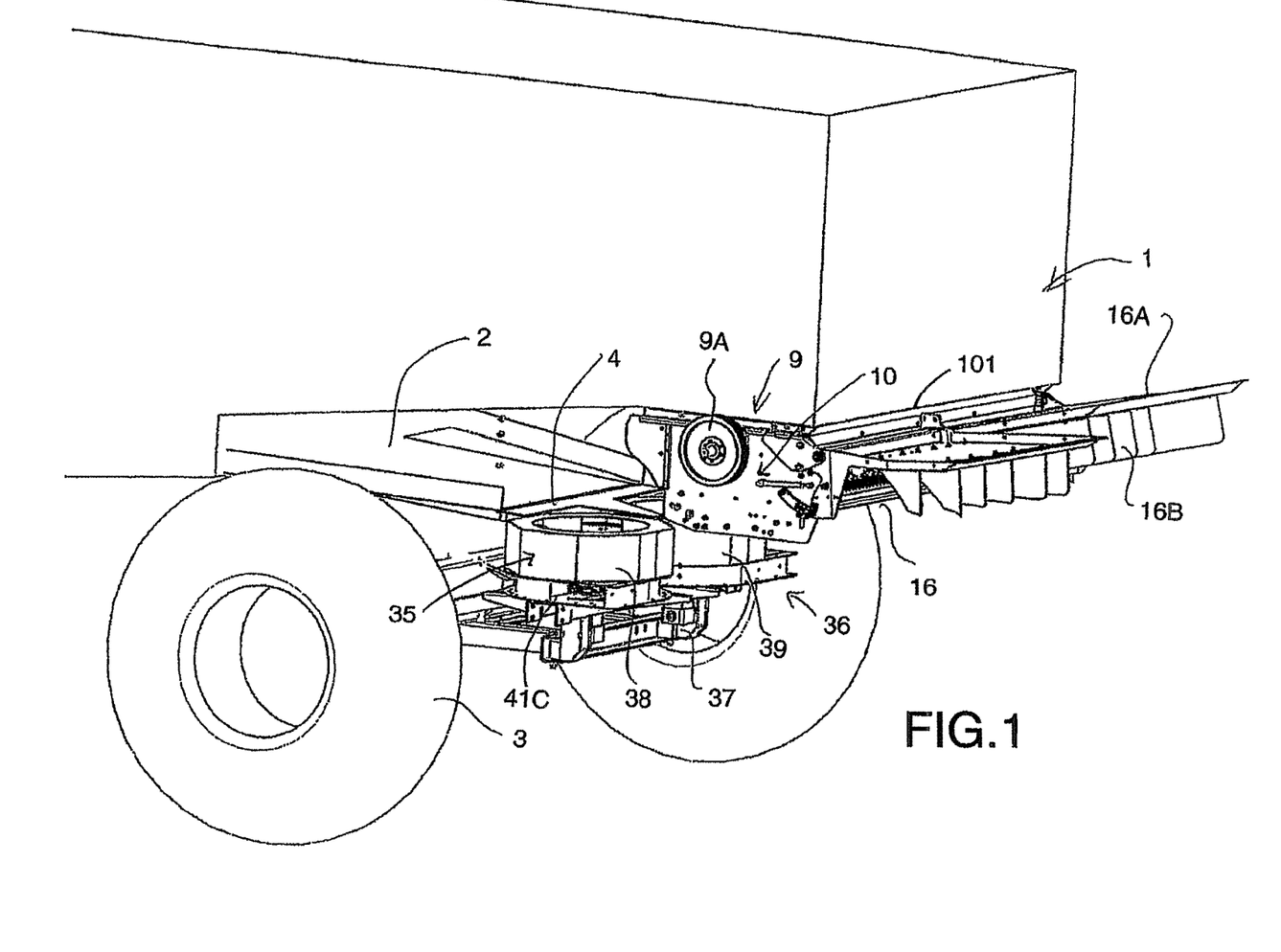
FIG. 1 is an isometric view of an apparatus for destruction of weed seeds according to the present invention which is arranged in a first embodiment where the weed seed destruction section is mounted at a position on a combine harvester at the rear of the sieve so as to discharge the chaff and destroyed seeds away from the straw chopper to both sides of the combine harvester.

The apparatus herein is shown in FIG. 1 mounted on a combine harvester 1 carried on ground wheels 3 and including harvesting components of a conventional nature the rearmost one of which is the sieve 2 which discharges chaff and discarded seeds including weed seeds to the rear edge 4 of the sieve.

Figure 6:
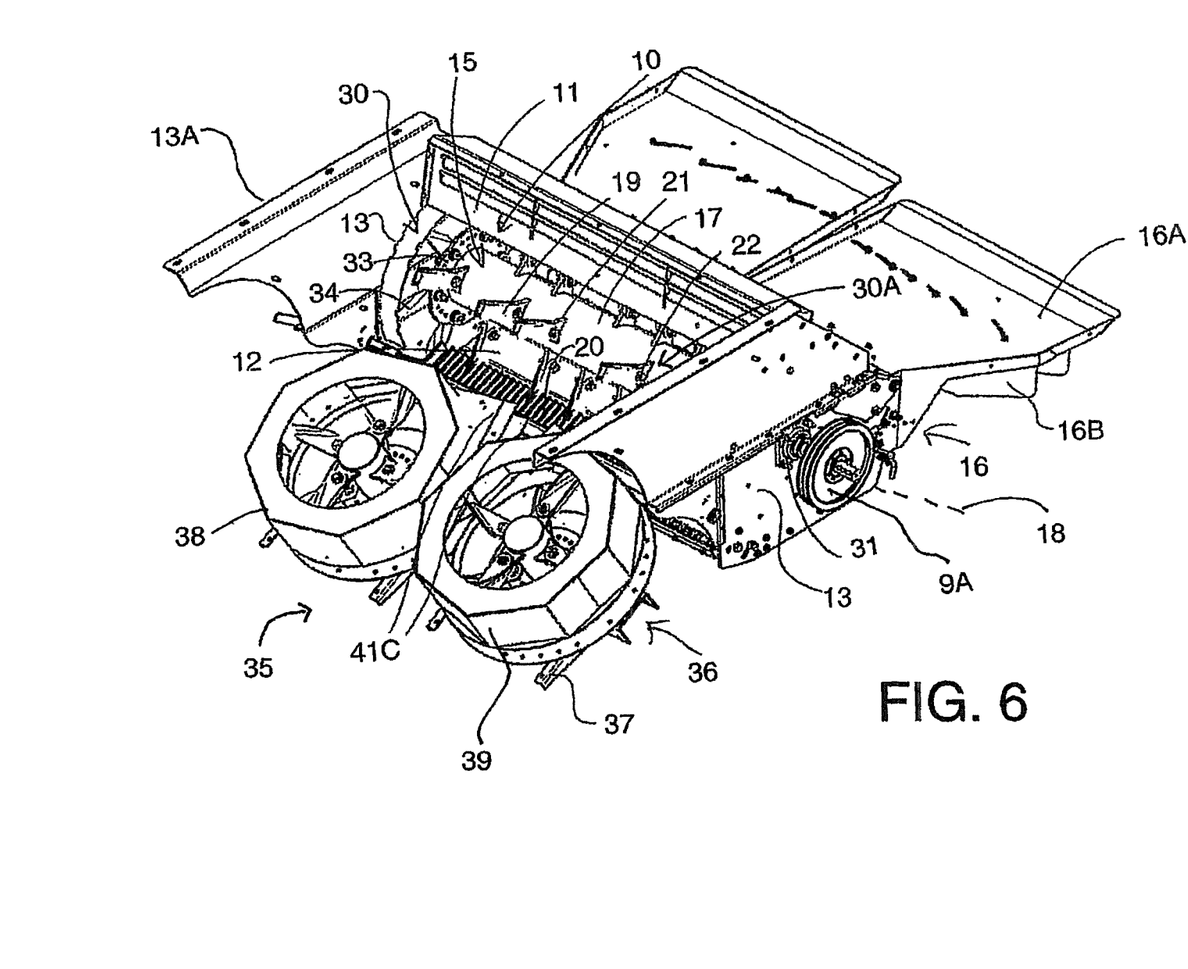
FIG. 6 is an isometric view of the weed seed destruction section according to the present invention which is arranged to feed the discharged material into the chopper rotor of the straw chopper section at the center thereof.

The combine harvester includes a chopper and discharge arrangement 9 shown in FIGS. 1 and 6 is basically as shown in U.S. Pat. No. 6,840,854 issued Jan. 11, 2005 of Redekop, to which reference may be made. The chopper thus comprises a housing 10 defined by a top wall 11, a bottom wall 12 and two end walls 13. The end walls 13 include attachment means 13A for attachment of the housing to the outlet of a combine harvester for discharge of straw and optionally chaff from the combine harvester into an inlet opening 15 of the housing 10. The bottom wall 12 defines a semi-cylindrical portion extending from the inlet 15 to an outlet 16 through which chopped straw and air is discharged at relatively high velocity for spreading across the field or for transportation into a container.

Within the housing is mounted a hub 17 which is carried on suitable bearings 31 for rotation about a hub axis 18 at a center of the housing so that blade members 19 carried by the hub sweep around within the housing to entrap straw fed through the inlet 15 and to carry the straw and air past stationary blades 20 for chopping and for discharge through the outlet 16. The stationary blades 20 are mounted on the housing at a position approximately midway between the inlet 15 and the outlet 16 so that the blade members 19 sweep between the stationary blades in a cutting action.

The hub 17 carries a plurality of lugs 21 at angularly and axially spaced positions therealong with each lug mounting a pair of blades 19 for pivotal movement of the blade members 19 about a pin 22 parallel to the axis 18. Each of the lugs 21 carries a pair of the blades 19. Each lug 21 is aligned with a respective one of the stationary blades 20 so that each stationary blade has associated with it a respective one of the lugs and thus has associated with it the pair of blades carried by that lug.

In this arrangement of the chopper, there is provided three axially spaced sections of the chopper assembly including a first fan section 30 at one end of the hub 17 and the second fan section at the other end of the hub 17. In-between the two narrow fan sections 30 is defined a center section 30A which provides the whole of the cutting action.

Within the center section 30A all of the blades 19 are formed with a cutting edge lying in a radial plane of the axis. The blades are preferably of the conventional flat blade type with a leading and trailing chamfered edge. Thus each of the two cutting blades 19 in the center section can pass closely on either side of a respective one of the stationary blades 20. Thus the stationary blades can be spaced by a distance which is just sufficient to allow the passage there between of the preferably flat cutting blade. In the preferred arrangement, the spacing between the stationary blades is thus small in that the stationary blades are not sufficiently spaced to allow the passage there between of a fan type blade.

In the fan sections 30, there is provided a ring 33 which is mounted on the hub 17 at a respective end of the hub. The ring thus surrounds the cylindrical wall of the hub and stands outwardly therefrom just beyond the end of the center section defined by the stationary blades and the blades 19 carried on the hub.

The rings 33 each carry a plurality of fan blades 34 at spaced positions around the ring. The fan blades 34 are arranged thus so that each follow directly behind the next at the same axial location.

Each of the fan blades 34 is bent with a fan blade portion so that each of the fan blades is of the shape shown in FIG. 3 of U.S. Pat. No. 5,482,508 of Redekop, to which reference may be made. However the fan blades 34 do not necessarily have a sharpened leading edge since there is intended to be no cutting action in the fan section. Thus the fan blades are spaced from the end most stationary blade 19 so that in effect no cutting action occurs in this section.

The bent fan blade portion stands outwardly to one side of the flat plate portion of the fan blade 34. The fan blade portion which is bent at right angles to the main body of the fan blade is maximised in dimension so that it may be rectangular. This large blade area together with the presence of the six blades provides a large fan blade area which generates a significant air flow.

The fan blade portion is inclined forwardly and outwardly so that at a regularly outer position toward the outer end of each fan blade the fan blade portion is angularly advanced relative to its position closer to the axis of the hub. This incline outwardly and forwardly significantly increases the air flow effect driving the air in the greater volume and at higher speed radially from the fan section and outwardly of the exit 16.

Preferably the fan section comprises only a single row of the six fan blades but in some cases an additional row or rows may be provided although this is not preferred. The fan blades are arranged immediately adjacent the end walls 13 so that they take up minimum space at the end of the chopper assembly. It will be appreciated that the intention is to provide maximum air flow in the fan sections while taking up minimum dimensions so that the maximised chopping effect to provide shortest material is achieved within the center section using the flat blades.

The above arrangement of straw chopper section is one example only of arrangements which can be used herein.

The chopper and spreading assembly 9 is arranged to be mounted at a rear straw discharge 101 of the combine harvester 1 and includes the housing 10, the rotor 17 mounted in the housing 10 for rotation around a generally horizontal axis and carrying the plurality of chopper blades 19 for chopping the discharge material.

At the exit 16 is provided the material spreading assembly which can be the form of a tailboard 16A with guide fins 16B for receiving the chopped material and spreading the material to the rear and sides of the combine harvester.

An apparatus 35 for destroying seeds comprises a body 36 carried on a frame 37 mounted at a suitable location on the combine harvester by mounting arrangements of a conventional arrangement. The body provides two side by side housings 38, 39 each located adjacent a respected half of the discharge location the feed material containing separated chaff and discarded seeds separated by the combine harvester from harvested crop. In the embodiment shown in FIG. 1, the housings are located at the rear edge 4 of the sieve 2.

Figure 3:
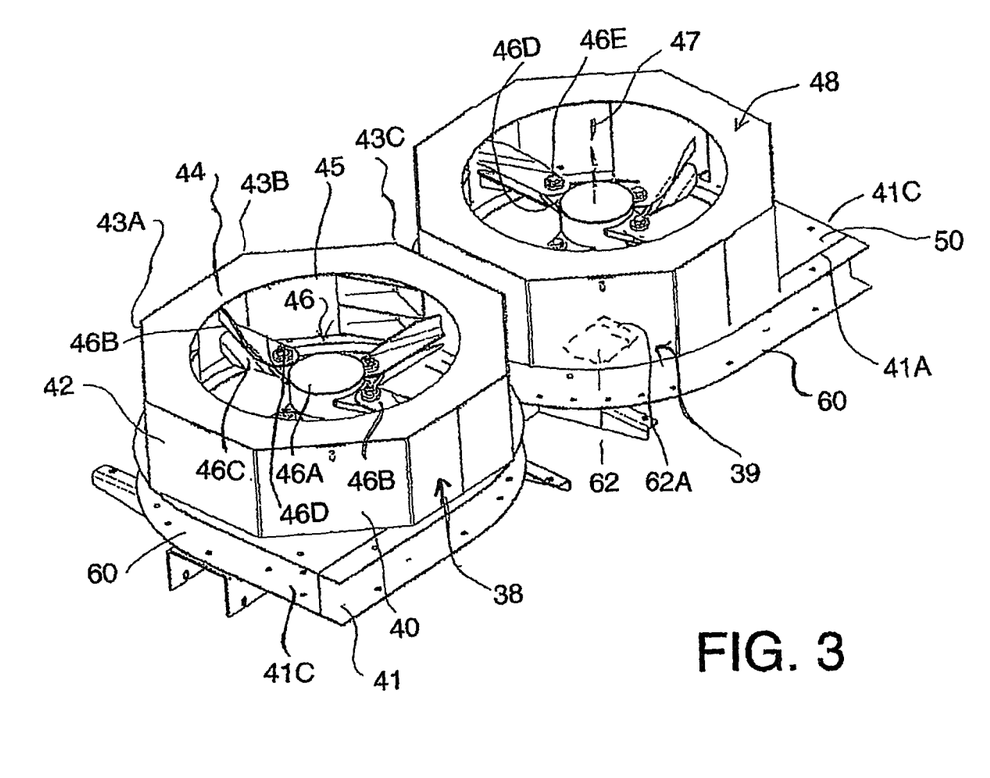
FIG. 3 is an isometric view of the weed seed destruction section of FIG. 1 separate from the combine harvester with the discharge housing arranged for discharge to the sides.
Figure 4:
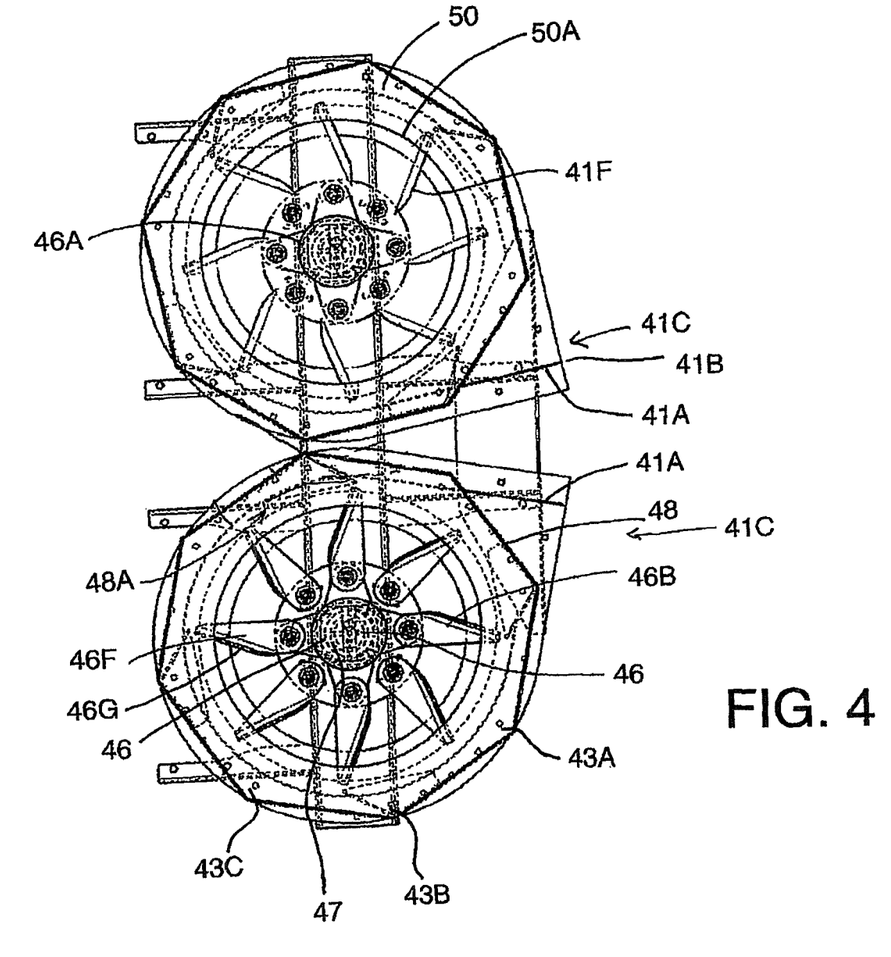
FIG. 4 is a top plan view of the weed seed destruction section of FIG. 3 separate from the combine harvester with the discharge housing arranged for discharge to the rear.
Figure 5:
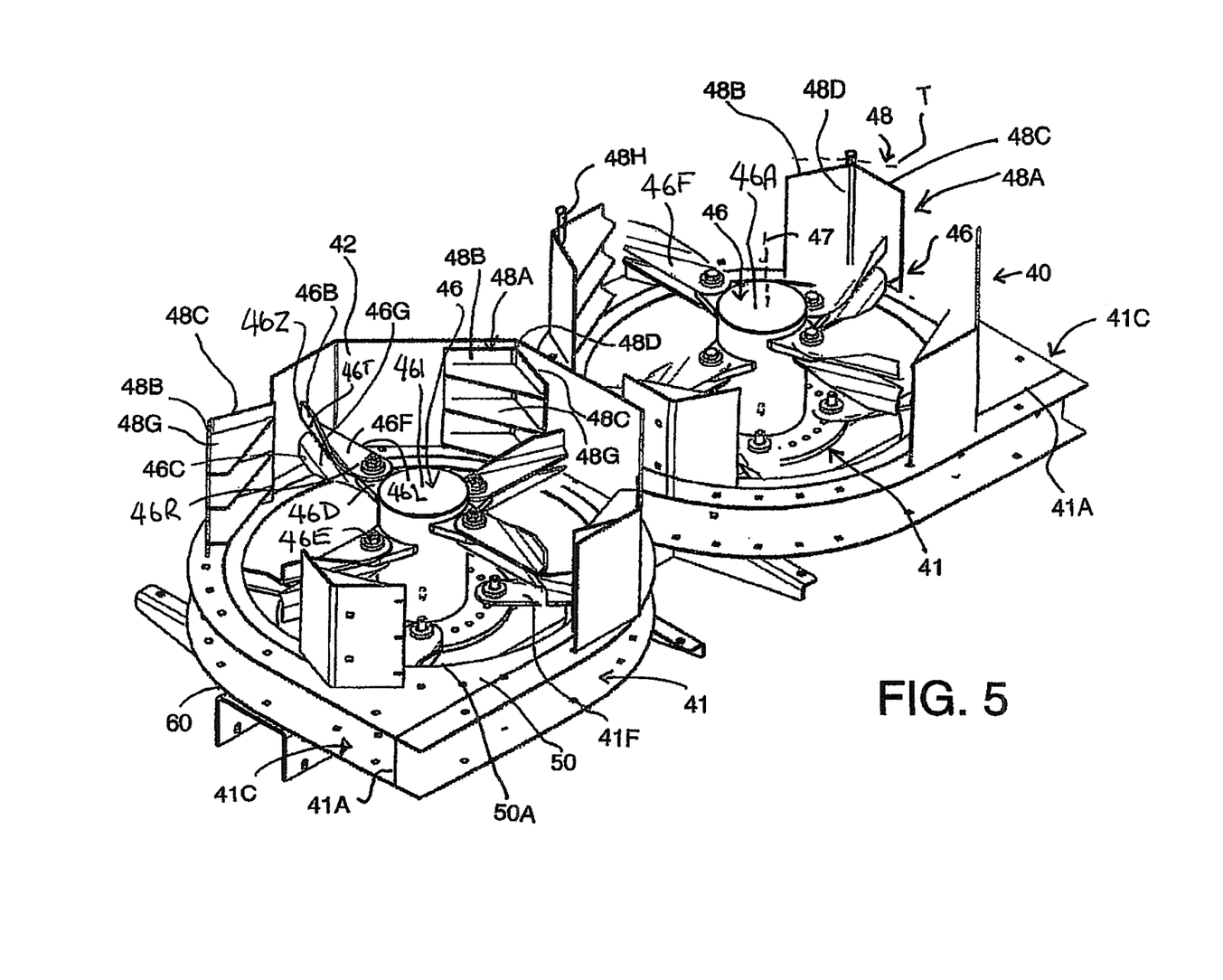
FIG. 5 is an isometric view of the weed seed destruction section of FIG. 3 with a part of the housing removed.

Each of the housings, as best shown in FIGS. 3, 4 and 5 includes an upper impact section 40 and a lower fan section 41. The upper section 40 includes a housing 42 which is polygonal (in this example octagonal) in plan view with apexes 43A, 43B, 43C etc. The housing 42 incudes a top wall 44 connected to the polygonal side wall and defining a circular opening 45 arranged to be mounted at the discharge location of a combine harvester for receiving from the sieve the chaff and discarded seeds including the weed seeds.

A rotor 46 is mounted in the housing for rotation about an upstanding axis 47 at right angles to a bottom base of the housing axis. The rotor includes a cylindrical hub 46A carrying upper and lower sets of blades 46B and 46C. The sets are spaced axially. The individual blades of the set are spaced angularly. The sets are carried above and below respectively a series of angularly spaced lugs 46D on pins 46E so as to act as flails.

Each blade includes as best shown in FIG. 5 a base plate 46F lying in a radial plane and a blade portion 46G turned out of the radial plane so as to act as a fan blade to drive entrained air and the material centrifugally outwardly from the axis of the rotor.

As best shown in FIG. 5, the lugs 46D are located adjacent a top face 46I of the hub 46A of the rotor 46 so that the base plate 46F of each blade lies in or closely adjacent to a plane of the top face 46I. The blade portion 46G stands upward from the base plate 46F and hence extends in the axial direction of the rotor axis to an upper end edge 46U at a position beyond the upper face 46I of the hub 46A.

As best shown in FIG. 5, the blade portion 46G of each blade extends diagonally across the base plate 46F from a radially inner end 46R of the blade portion 46G at a trailing edge 46T of the base plate 46F to a radially outer end 46Z of the blade portion at a leading edge 46L of the base plate 46F. Thus the blade portion is inclined to a radius of the respective pivot axis of the pin 46E so that the radially outer end 46Z of the blade portion 46G is angularly advanced relative to the radially inner end 46R of the blade portion 46G.

Thus the rotor includes components thereon defined by the two sets of blades for engaging the feed material and for accelerating the feed material in a centrifugal direction away from the rotor.

In the housing around the rotor is provided a stator 48 defined by the inside surface of the polygonal housing 40 and arranged at a location centrifugally outside the rotor 46 so that the material and discarded seeds thrown outwardly impact on the stator. The stator includes a series of surface elements 48A for engaging the discarded seeds in the accelerated material and arranged such that the discarded seeds impact thereon and rebound therefrom back toward the rotor.

Thus the rotor 46 and stator 48 are arranged such that the discarded seeds rebound back and forth between the rotor 46 and the stator 48 to provide a plurality of impacts on the feed material to destroy the seeds.

The housing includes a discharge opening defined by a circular inner edge 50A of a plate 50 lying in a radial plane of the housing between the impact section 40 and the fan section 41. Thus the bottom of the impact section is defined by the bottom plate 50 so that air and the entrained material is directed downwardly into the fan section for discharge of the feed material after the plurality of impacts. As the air and entrained material passes downwardly, the discarded seeds discharge from the rotor and do not pass or escape outwardly through the stator 48. That is the stator wholly or substantially wholly surrounds the rotor section to prevent the seeds from escaping radially. That is all of the seeds are rebounded back inwardly to the rotor and move downwardly while rebounding back and forth until they pass out of the impact section at the bottom through the hole 50A in the plate 50 into the fan section 41.

Thus the rotor 46 rotates around the axis 47 so as to direct the discarded seeds centrifugally outwardly. The stator 48 surrounds the axis 47 so as to rebound the discarded seeds back toward the axis and the discharge opening is arranged such that the discarded seeds discharge axially from within the stator. In this way, the feed material containing the discarded seeds enters the housing axially of the rotor at the top end and discharges axially from the bottom end of the rotor into the fan section, where the material is accelerated radially outwardly into a channel defined by a peripheral wall 41A which spirals gradually outwardly from a leading edge to a trailing edge 41B so as to define an outlet location 41C.

Thus the fan section 41 shown in plan in FIG. 4 at the top includes a series of blades 41F carried on the rotor 46A underneath the plate 50 so that the fan components act for driving the discarded seeds from the opposite or bottom end of the rotor 46 radially outwardly to the discharge opening 41C at the trailing edge 41B.

As best shown in FIG. 5, each of the stator surfaces 48A comprises a generally V-shaped body with two walls 48B and 48C converging to an apex 48D which is located at one of the apexes of the polygonally shaped housing. In FIG. 5 is shown one of the stator surfaces 48A and it will be noted that the wall 48C against which the seeds are primarily directed as the rotor 46 turns clockwise is arranged at an angle to a tangent T of an imaginary cylindrical surface surrounding the axis. Thus the surface 48C is inclined forwardly and inwardly so that the seeds moving with the rotor and outwardly of the rotor impact against the surface 48C and are rebounded inwardly. The stator surface portion 48A is mounted at the apex 48D by a hinge pin 48H which allows the angle of the stator surface 48C to the tangent T to be adjustable to change the level of aggression in the rebound action.

Also the hinged mounting of the stator surface portion 48A allows the stator surfaces to pivot to allow the passage of foreign objects between the rotor 46 at the outer tip of the blades 46B, 46C and stator as defined by the surface portions 48A. Also the stator surface portions are readily removable for replacement by pulling the support pin 48H when damaged or worn.

Also the stator surface portions 48A include one or more fins 48G lying in a plane at right angles to the walls 48B, 48C and thus extending in a radial plane around the rotor. The stator has an octagonal shape and there are four of the stator surface portions 48A at four of the apexes of the polygon leaving the remainder of the inner surface of the octagon exposed to act as the stator surface. This stator surface surrounds the whole of the rotor and hence prevents outward escape of any material, thus confining the material to move downwardly into the fan section for ejection.

Figure 8:
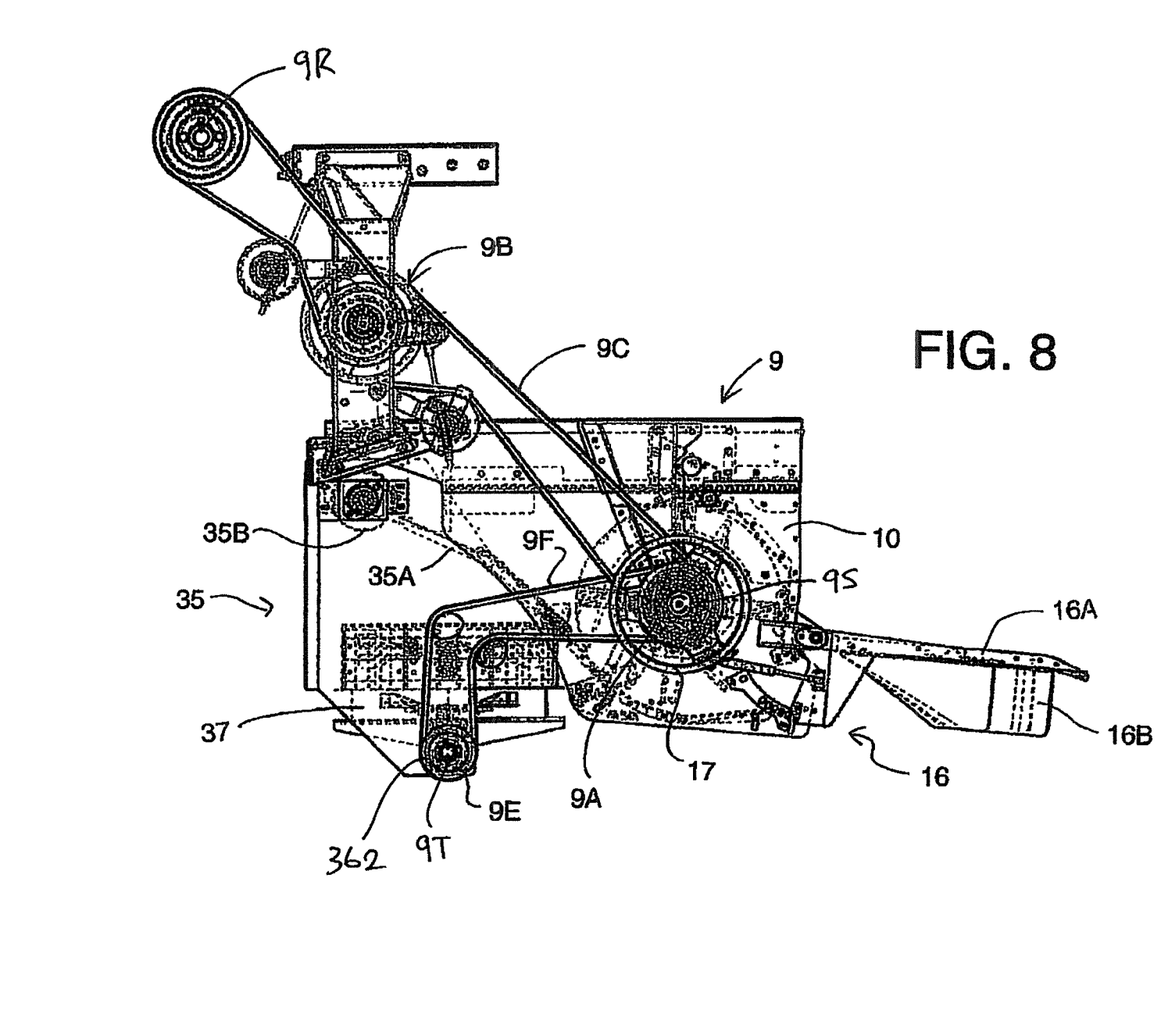
FIG. 8 is a side elevational view of the apparatus of FIG. 2 showing the drive system to the combined apparatus including the straw chopper section and the seed destructor section.

The rotor 46 which carries both the blades of the impact section and fan blades 41F of the discharge fan section 41 as best shown in FIG. 8, is driven by a hydraulic drive motor 46H, the rotational speed of which is adjustable to change the speed of the impact blades and thus the number of impacts a seed encounters during its passage.

Also the velocity of air along the rotor through the impact section from the opening at the top plate 44 to the discharge plate 50 is adjustable to change the number of impacts a seed encounters during its passage.

The rotor and particularly the stator are shaped and arranged so that the impacts and rebounding action act to move the discarded seeds along the rotor from the feed opening at the top plate 44 to the discharge opening at the plate 50 so as to change the position along the rotor at which the impacts of the discarded seeds occurs. Thus the seeds as they rebound back and forth move through the impact section at a rate depending on the shape and position of the stator surfaces and depending on the rotation rate of the rotor and the air speed through the impact section.

In a typical walker style combine there is a large space between chopper 9 and the end of the sieve 2. In this case the seed destructor 36 is mounted at the end of the sieve 2. In this position, the discharge openings 41C of the fan section 41 are located by rotating the housings 38, 39 so that the seed destructor discharge is set to the side because the discharges are not close enough to the chopper 9 to allow feeding into the chopper.

The seed destructor is made up of two rotating drums or rotors 46 within the housings 38 and 39 rotating in opposite directions. The housings are rotatably mounted on the frame 37 so that the discharge 41C can be pointed in the direction required. Although this is shown as a fixed mounting it could be easily designed as a movable mounting so the operator could change it quickly as desired. In one arrangement the adjustment can be obtained conveniently by rotation of the housing around the axis of the rotor.

The impact section 40 contains in the stator 48 replaceable, adjustable impact plates or surface portions 48A, in which the residue that is dropped into the seed destructor housing is flung against by the rotors 46 with blades 46B and 46C. The residue is deflected back by the stator into the rotating blades for another hit.

The fan section 41 at the bottom of the housing acts to accelerate the residue for spreading back onto the field or into the chopper or into the chopper fins as desired.

The rotors can be driven by hydraulic motors which power and mount the rotating hubs 46 in which case the motors are mounted to the frame 37.

The impact plates 48A are rotatably adjustable at the apex 48D and designed to deflect the residue back into the high speed blades. The guide fins 48G on the impact plates serve to control the angle that the residue is deflected and therefore the number of times the residue rotates in the housing and thus the number of hits a seed encounters in its passage through the destructor. The impact plates 48A are replaceable and are hard surface coated for a longer life.

At the bottom of the housing assembly below the fan section 41 is provided a bottom plate 60 closing the bottom of the fan section 41 below the plate 50. In the plate 60 is defined an air inlet schematically indicated at 62 which regulates the flow of exterior air into the fan section through the plate 60. The opening size of the air inlet 62 can also be varied by an adjustment 62A. As the adjustment 62A control the amount of air entering into the fan section, this adjustment increases or reduces the amount of air drawn through the opening 50A in the plate 50 and thus also serves to change the speed of the residue flowing through the assembly. The air inlet 62 can be regulated so that, as it is closed off, the speed of the residue flow increases, to the point when closed, all air is sucked in from the top of the assembly at the plate 44, to be discharged with the fan in the discharge zone 41. When entirely opened the majority of the air is drawn from the bottom plate 60 of the assembly and the speed of the residue flowing through the assembly is reduced allowing for more impacts.

A third method to adjust the number of impacts a seed encounters through the assembly is of course with the speed of the rotor 46. The drive system to the rotor can be controlled by the combine or by a separate driver operated control and the speed of the assembly can be increased or decreased depending on factors such as seed size, residue toughness, or residue size including factors such as corn cob size and moisture content or sunflower head size.

In a preferred arrangement, the seed destructor section 36 is integrated into the chopper 9 as a common unit with the chopper 9. In this arrangement the seed destruction section 36 acts two receive all residue from the sieves. The weed seeds are destroyed in the seed destructor and can be ejected into the chopper for spread with the straw residue on the tailboard 16A.

In this arrangement the combination of all of the residue from both the sieves and the straw exit into the chopper allows the destroyed seeds and chaff residue to mix with the straw residue and be spread in a much wider spread pattern. That is in FIG. 6, the discharge openings 41C from the fan section 41 of the seed destruction section 36 are turned on the frame 37 so that they are directed to the center of the inlet 12 of the chopper 9.

Figure 7:
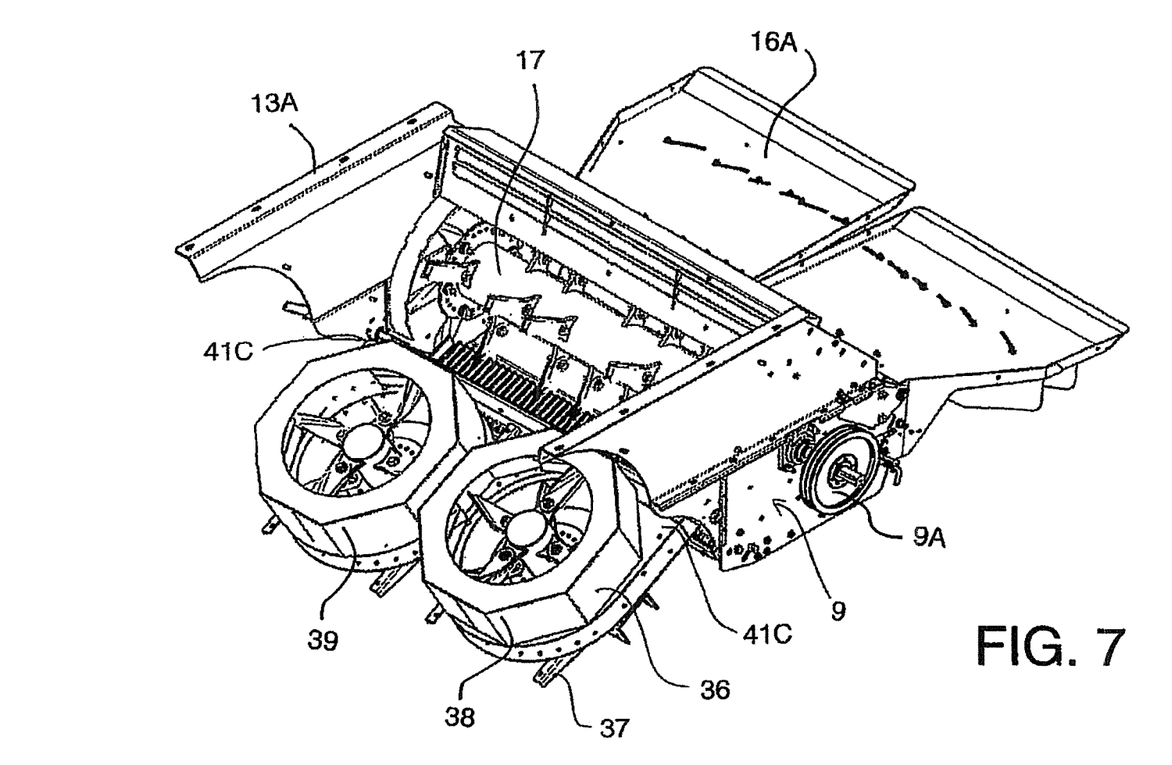
FIG. 7 is an isometric view of the apparatus of FIG. 6 adjusted to feed the discharged material into the straw chopper section at the sides so as to bypass the rotor and feed directly onto the tailboard.

Alternatively the chaff residue and destroyed seeds expelled from the seed destructor at the discharge openings 41C is expelled at the sides of the chopper at the fan sections 30 so as to bypass the center chopper section of the chopper so as to be directed by the chopper into the fins of the chopper for mixing on the tailboard 16A and spreading with the straw residue from the chopper.

As a third option, the discharge openings 41C can be positioned to the side to spread to the side of the combine as shown in FIG. 1. Thus the seed destruction section 36 is a part of or closely associated with the chopper 9. However the position of the outlet in the embodiment of FIG. 14 can be adjusted to the side in the same manner by rotation of the housings on the frame 37.

Thus the destruction section 36 and the chopper 9 form a common unit which can be supplied as a common assembly for attachment to the combine harvester. The common unit may include a common frame. The common unit can include a common drive arrangement by which a single output drive from the combine harvester is directed to the common unit and then directed by the drive mechanism to the chopper rotor and to the seed destruction section. The common unit can be arranged so that in one or more adjustment positions of the seed of destruction section the output from the fan section is directed into the chopper for common distribution into the field. It is also possible in this arrangement that the seed destruction section be adjusted so that the output therefrom is directed into the field bypassing the chopper.

In an arrangement where the space between the sieve 2 and the straw outlet is greater than can be accommodated by direct feed from the sieve into the inlet of the seed destruction section, a feed duct or other transfer arrangement can be provided.

Thus the combined apparatus comprises the straw chopper 9 as described above together with the apparatus for destroying weed seeds as described above where the discharge opening of the housing is arranged such that the discharge opening can be directed to the side of the combine away from the straw chopper, towards the guide fins of the tailboard of the chopper, or into the housing of the straw chopper.

Figure 9:
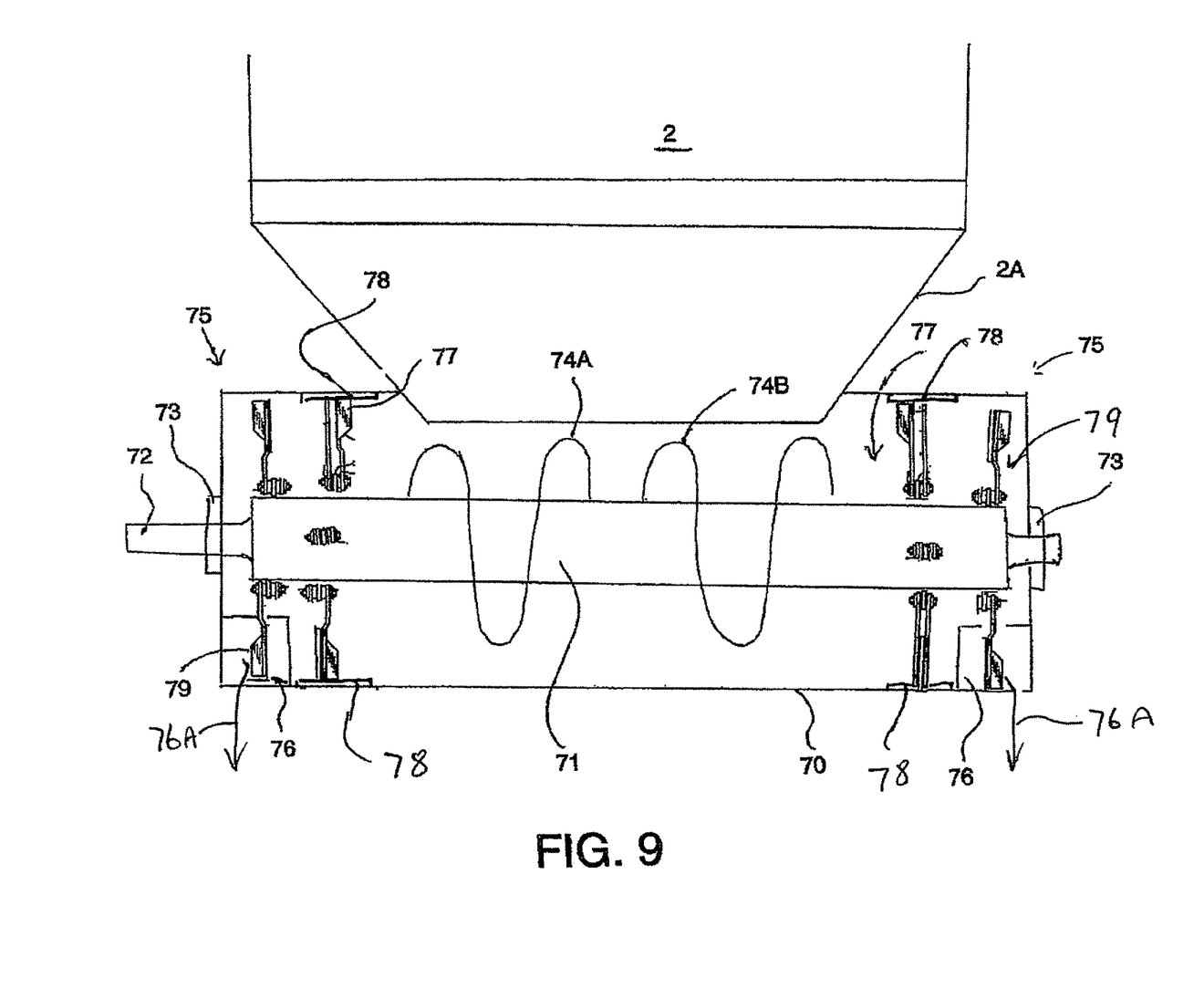
FIG. 9 is a plan view of an alternative arrangement of the weed seed destruction section where the rotors are arranged to rotate about a horizontal axis and thus rotate in a vertical plane to discharge rearwardly.

As an alternate embodiment shown in FIG. 9 the apparatus forming the weed seed destructor section can be designed as a horizontal tube or duct 70 forming an elongate housing into which the material is fed from the sieve 2 by a feed duct 2A. This can be readily located at this position by a combine manufacturer as a horizontal duct in their combine at a position ahead of the rear discharge for chaff.

The duct 70 contains has a transverse shaft 71 driven at one end 72 and carried on end walls of the duct 70 at bearings 73. The shaft carries auger fighting 74A, 74B divided in the middle so as to move chaff axially along the housing from the inlet at the duct 2A outwardly to each respective end of the horizontal rotor defined by the shaft 71 and flighting 74A, 74B. The arrangement thus provides seed destructors 75, corresponding to seed destructors 36, symmetrical to and operating in the same manner as that previously described but arranged in an orientation at 90 degrees to that shown previously and rotating in a vertical plane about a horizontal axis defined by the shaft 71. Thus the destructor 75 includes a rotor 77 and stator 78, corresponding to the rotor 46 and stator 48, as previously described and a fan section 79, corresponding to the fan section 41 as previous described. The fan section 79 communicates with a discharge zone 76, corresponding to the outlet location 41C, which is located at the end of the rotor 77 to expel the chaff and weed seeds after treatment along direction 76A into a secondary spreading device, or into a straw chopper or into the tail board fins of the straw chopper. The auger flightings 74A, 74B and the rotor 77 and the fan section 79 thus form the horizontal rotor defining a generally cylindrical body within the tube or housing 70.

Figure 2:
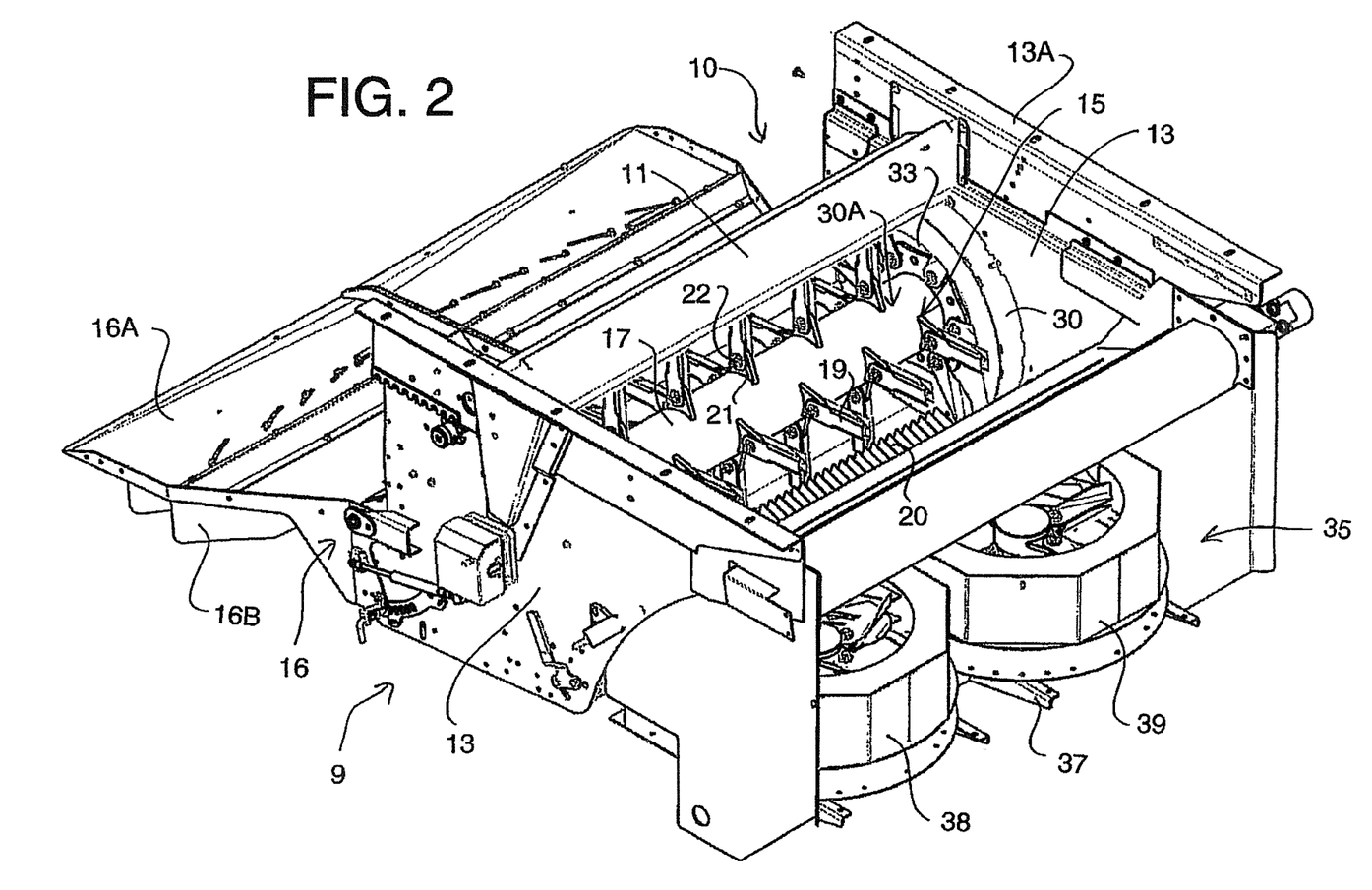
FIG. 2 is an isometric view from the front and one side of the combined apparatus including the straw chopper section and the weed seed destruction section of FIG. 1.
Figure 2A:
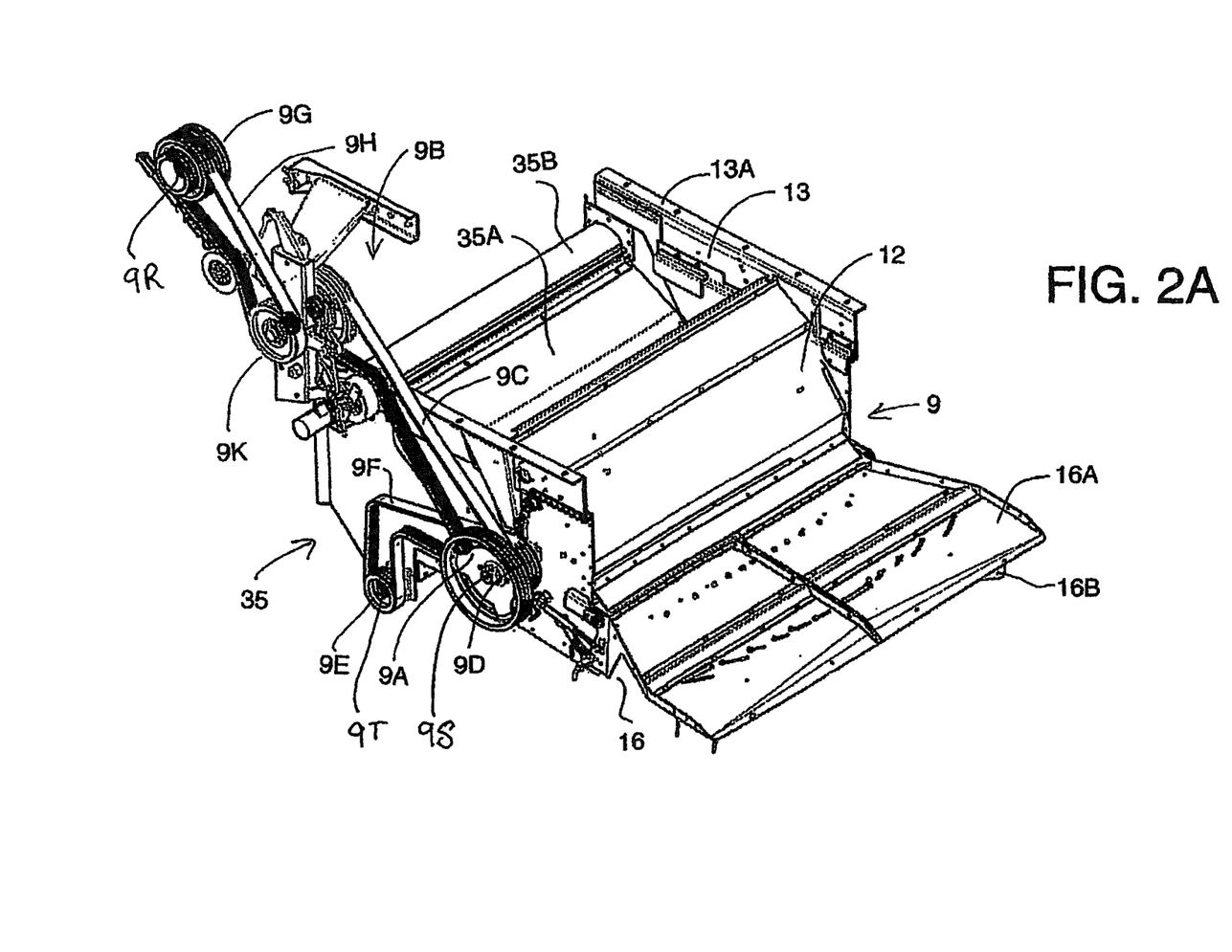
FIG. 2A is an isometric view from the rear and the other side of the combined apparatus including the straw chopper section and the weed seed destruction section of FIG. 1.

As shown in FIGS. 2A and 8 housing of the chopper section 9 and the seed destructor section 35 are formed as a common or integral construction coupled together as single or common unit which can be mounted on the combine harvester at the rear of the combine so as to be associated with the rear straw discharge and the rear chaff discharge.

The chopper 9 has an input drive pulley 9A on a shaft 9S connected to the rotor 17 driven by a belt 9C or other drive component or pulley assembly 9B from the combine. In addition the pulley 9A of the chopper drives an output pulley 9D which communicates drive to the seed of destruction section 35 through a pulley 9E on a shaft 9T driven by a belt 9F. In the arrangement shown the pulleys 9A and 9D are mounted at the same end of the rotor 17 but this is not essential. The drive 9B to the chopper can be as shown where the output pulley 9G on a shaft 9R of the combine drives a belt 9H connected to a pulley system 9K to drive the belt 9C. Thus as shown in FIG. 2A, the shafts 9R, 9S and 9T are all parallel. Other drive arrangements can be used such as a shaft from an output gearbox.

A shroud or hood 35A is over the seed destructor section to allow for the chaff to be directed underneath the hood into the seed destructor. A roller 35B is required at the leading edge of the hood 35A to eliminate material buildup on the leading edge which could cause possible plugging. The roller rotates in a clockwise direction at 200-500 rpm to roll any long straw over to the chopper section 9 while the chaff and weed seeds flow under the hood the destructor section 35.

While the arrangement shown herein is shown as an externally mounted chopper carried on the combine harvester at the rear straw discharge, some combines include an internal chopper mounted in the housing at a position in advance of the rear discharge. In this arrangement the seed destructor section can be located at the chaff discharge and arranged to direct material into the internal chopper or away from the internal chopper to the ground. In this case the internal chopper does not cooperate directly with a spreading system such as a tail board.

The invention claimed is:
1. A combine harvester comprising:
  a separation system for separating from harvested crop a first material comprising straw and a second material comprising chaff and weed seeds;
  the separation system comprising at least one sieve having a rear edge from which the second material is discharged;
  a weed seed destructor section for receiving the second material from the rear edge of the sieve, the weed seed destructor section comprising:
    a housing mounted at the rear edge of the sieve extending across the combine harvester for receiving both the chaff and weed seeds from the sieve as the chaff and weed seeds pass over the rear edge;

a horizontal transfer member extending along the housing across the combine harvester mounted for rotation about a longitudinal axis, the horizontal transfer member being shaped to carry both the chaff and weed seeds along the housing;

the horizontal transfer member including a drive shaft along the longitudinal axis;

at least one weed seed destructor for receiving both the chaff and weed seeds comprising destructor components in the housing which cause devitalization of the weed seeds so as to reduce a number of the weed seeds that can germinate;

at least one discharge outlet at an angularly restricted location in the housing facing radially outwardly of the longitudinal axis; and fan components on the horizontal transfer member for rotation therewith driving the chaff and weed seeds outwardly through the at least one discharge outlet.

2. The combine harvester according to claim 1 wherein the at least one discharge outlet is arranged to discharge the chaff and weed seeds in a spreading action using at least in part an air stream generated by the fan components.

3. The combine harvester according to claim 1 including a straw spreading section for spreading the first material comprising straw, wherein the at least one discharge outlet is arranged to discharge the chaff and weed seeds in a spreading action by combining the chaff and weed seeds from the at least one discharge outlet with the straw.

4. The combine harvester according to claim 1 wherein the at least one discharge outlet is arranged to expel the chaff and weed seeds toward an underside of a tailboard extending across the combine harvester and including a plurality of downwardly extending guide fins.

5. The combine harvester according to claim 1 including a straw spreading section for the first material comprising straw including a straw chopper with rotating cutting blades and stationary cutting blades for forming chopped straw, and a spreading device for receiving the chopped straw from the straw chopper for spreading the chopped straw, and wherein the at least one discharge outlet is arranged to discharge the chaff and weed seeds in a spreading action by combining the chaff and weed seeds from the at least one discharge outlet with the chopped straw.

6. The combine harvester according to claim 5 wherein the at least one discharge outlet is arranged to discharge the chaff and weed seeds in a spreading action by combining the chaff and weed seeds with the straw while bypassing the rotating cutting blades and the stationary cutting blades.

7. The combine harvester according to claim 5 wherein the spreading device comprises a tailboard with a plurality of fins.

8. The combine harvester according to claim 1 wherein the horizontal transfer member comprises an auger flight.

9. The combine harvester according to claim 5 wherein there is a common belt drive from the combine harvester to the straw chopper and the horizontal transfer member.

10. The combine harvester according to claim 5 wherein there is provided a drive output shaft powered by a power source of the combine harvester with the drive output shaft extending transverse to the combine harvester and wherein the straw chopper receives drive from the drive output shaft.

11. The combine harvester according to claim 5 wherein an input drive shaft of the straw chopper and the horizontal transfer member are parallel and extend transverse to the combine harvester.

12. The combine harvester according to claim 5 wherein there is provided at least one mechanical drive transfer arrangement connecting a drive output shaft to the horizontal transfer member and to an input drive shaft of the straw chopper, the at least one mechanical drive transfer arrangement comprising at least one drive belt extending between the horizontal transfer member and the input drive shaft of the straw chopper.

13. The combine harvester according to claim 5 wherein there is provided a jack shaft extending transverse to the combine harvester, a first mechanical drive transfer arrangement connecting a drive output shaft to the jack shaft, at least one second mechanical drive transfer arrangement connecting the jack shaft to the horizontal transfer member and to an input drive shaft of the straw chopper, the at least one second mechanical drive transfer arrangement including at least one drive belt.

14. The combine harvester according to claim 13 wherein the jack shaft, the horizontal transfer member, the input drive shaft of the straw chopper and the drive output shaft are parallel.

15. The combine harvester according to claim 1 wherein the destructor components comprise stator surfaces of a stator arranged such that the weed seeds impact on the stator surfaces and do not pass through the stator between the stator surfaces but instead are rebounded back from the stator toward a cylindrical body, the cylindrical body and stator being arranged such that the weed seeds rebound back and forth between the cylindrical body and the stator to provide a plurality of impacts on the second material to destroy at least some of the weed seeds.

16. The combine harvester according to claim 15 wherein the discharge opening is at a location different from the stator surfaces so that the weed seeds discharged through the discharge opening do not pass through the stator between the stator surfaces.

17. The combine harvester according to claim 15 wherein the stator surfaces of the stator are mounted on an inside surface of the housing.

18. The combine harvester according to claim 15 wherein the cylindrical body comprise blades mounted on a hub and where an outside edge of the blades passes adjacent the stator surfaces with no intervening rotor or stator components.

* * * * *